(12) United States Patent
Poulter et al.

(10) Patent No.: US 9,381,448 B2
(45) Date of Patent: Jul. 5, 2016

(54) DISTRIBUTION ARRAY FOR USE IN A SETTLER AREA OF A MIXER-SETTLER

(75) Inventors: Scott Brian Poulter, Birkdale (AU); Ross Jeffrey Haywood, Cashmere (AU); Wesley Adam Taylor, Warner (AU)

(73) Assignee: Hatch Associates Pty Ltd, Perth, Western Australia (AU)

( * ) Notice: Subject to any disclaimer, the term of this patent is extended or adjusted under 35 U.S.C. 154(b) by 256 days.

(21) Appl. No.: 14/112,260

(22) PCT Filed: Apr. 11, 2012

(86) PCT No.: PCT/AU2012/000362
§ 371 (c)(1),
(2), (4) Date: Dec. 17, 2013

(87) PCT Pub. No.: WO2012/142648
PCT Pub. Date: Oct. 26, 2012

(65) Prior Publication Data
US 2014/0083956 A1    Mar. 27, 2014

(30) Foreign Application Priority Data

Apr. 20, 2011   (AU) .............................. 2011901491

(51) Int. Cl.
| | | |
|---|---|---|
| *B01D 11/04* | (2006.01) | |
| *B01D 17/028* | (2006.01) | |
| *B01D 17/02* | (2006.01) | |
| *C22B 3/26* | (2006.01) | |
| *C22B 3/02* | (2006.01) | |

(52) U.S. Cl.
CPC ........ *B01D 17/0211* (2013.01); *B01D 11/0453* (2013.01); *C22B 3/0005* (2013.01); *C22B 3/02* (2013.01); *Y02P 10/234* (2015.11)

(58) Field of Classification Search
CPC .......... B01D 11/0449; B01D 11/0453; B01D 17/0208; B01D 17/2011; B01D 17/0214; B01D 21/0042; B01D 21/0087; B01D 21/2405; B01D 21/2416; C22B 2/02
USPC ................. 210/634, 800, 801, 511, 519, 521, 210/532.1, 538, 540
See application file for complete search history.

(56) References Cited

U.S. PATENT DOCUMENTS

| | | | | | |
|---|---|---|---|---|---|
| 1,902,171 | A | * | 3/1933 | Kopp ........................ | C02F 3/28 210/538 |
| 3,419,145 | A | * | 12/1968 | De Celis ............ | B01D 17/0211 210/519 |
| 5,266,191 | A | * | 11/1993 | Greene .............. | B01D 17/0211 210/519 |
| 5,620,600 | A | * | 4/1997 | Smati ................. | B01D 21/2405 210/519 |
| 5,670,039 | A | * | 9/1997 | Harris ................... | B01D 21/02 210/521 |

(Continued)

OTHER PUBLICATIONS

International Search Report and Written Opinion for PCT/AU2012/000362, mailed Jun. 12, 2012; ISA/AU.

*Primary Examiner* — Christopher Upton
(74) *Attorney, Agent, or Firm* — Harness, Dickey & Pierce, P.L.C.

(57) ABSTRACT

A distribution array (10) for use in a settler area (12) of a mixer-settler, the distribution array (10) characterized by: at least one panel (26, 28) of linearly-spaced barrier elements (30), wherein the depth of the barrier elements (30), relative to a length of the settler area (12) in which it is to be positioned, is greater than the spacing between the barrier elements (30), thereby defining a fluid flow channel between adjacent barrier elements (30) that is longer than it is wide.

21 Claims, 2 Drawing Sheets

(56) References Cited

U.S. PATENT DOCUMENTS

| | | | | |
|---|---|---|---|---|
| 5,714,068 A * | 2/1998 | Brown | ............... | B01D 17/0208 210/519 |
| 6,083,400 A | 7/2000 | Nyman et al. | | |
| 6,099,732 A | 8/2000 | Dorlac | | |
| 6,132,615 A | 10/2000 | Nyman et al. | | |
| 6,783,009 B1 * | 8/2004 | Meurer | ................ | G05D 7/0186 210/521 |
| 6,827,865 B1 * | 12/2004 | Fenwick | ............ | B01D 17/0211 210/521 |
| 7,507,343 B2 | 3/2009 | San Lorenzo et al. | | |
| 7,678,275 B2 | 3/2010 | Nyman et al. | | |
| 7,731,853 B2 | 6/2010 | Ekman et al. | | |
| 2006/0162195 A1 * | 7/2006 | Langdon | ............ | B01D 21/0042 37/466 |

* cited by examiner

DISTRIBUTION ARRAY FOR USE IN A SETTLER AREA OF A MIXER-SETTLER

CROSS-REFERENCE TO RELATED APPLICATIONS

This application is a 371 U.S. National Stage of International Application No. PCT/AU2012/000362, filed on Apr. 11, 2012, and claims priority to Australian Patent Application No. 2011901491, filed on Apr. 20, 2011, the disclosures of which are herein incorporated by reference in their entirety.

TECHNICAL FIELD

The present invention relates to a distribution array. More particularly, the distribution array of the present invention is intended for use in solvent extraction and partitioning. Further, this invention relates to a settler feed distribution array, and to a method for facilitating even distribution of a dispersion in a settler area.

BACKGROUND ART

Liquid-liquid extraction, also referred to as solvent extraction or partitioning, is a method used in mineral processing to separate or extract compounds from one liquid phase into another liquid phase. This is accomplished by manipulating the relative solubilities of the compounds to be isolated in two or more liquids having differing characteristics, as is the case with an aqueous phase (such as water), and an organic solvent phase (such as an oil or immiscible organic solvent).

The term 'solvent extraction' can also refer to the separation of a substance from a mixture by preferentially dissolving that substance in a suitable solvent. In such a case, a soluble compound may be separated from an insoluble compound or a complex matrix.

Although the term 'partitioning' is sometimes used to refer to the underlying chemical and physical processes involved in liquid-liquid extraction, these terms as used herein may be considered synonymous.

In the field of solvent extraction, several hydrometallurgical systems have in the past been developed which incorporate systems for manipulating liquid flow streams and phases, and for separating, splitting, or isolating liquids or phases of liquids, and the desired compounds extracted by such systems. Typically, a mixture of an extractant in a diluent is used to extract a desired compound from one phase to another. In solvent extraction techniques this mixture is often referred to as the "organic" phase and entrained organics need to be removed or recovered from the eventual aqueous streams.

Many extraction processes make use of so-called mixer-settlers. Mixer-settlers are a type of mineral process equipment used in solvent extraction processes and consist of a first stage that mixes the phases together in an agitated tank (referred to as a mixer) followed by a quiescent settling stage, usually in the form of a gravity settling basin (settler) that allows the phases to separate by gravity. It is difficult to manage the flow of liquid in settlers to achieve sufficient separation of the various liquid phases and to minimise the settler area that is required to effect separation of the phases. The flow of liquids needs to be as laminar as possible, as flow interruptions or turbulence can lead to co-mixing of phases and resultant losses in extraction efficiency. Poor phase disengagement as a direct impact of turbulent flow also leads to, significantly higher solvent losses resulting in higher operating costs and significantly higher aqueous carryover resulting in final product impurity control issues. The settling stage allows the phases to separate, but achieving high flow rates can disturb the flow and hamper the process of separation, making it inefficient. Such systems are analysed using so-called CFD (computational fluid dynamics) modelling. Even feed distribution is important in achieving maximum possible value from the installed settler area.

In conventional mixer-settlers the intention is to distribute flow to both sides of the settler, first turning the flow through 90° and then back again through 90°. Further, reverse flow and side feed mixer-settlers distribute flow across the full width of the settler and turn the flow through 180° or 90°, respectively. However, such conventional distribution systems create recirculating zones and dead zones within the settler, in which fluid does not flow or flows in an unintended direction, often the reverse direction.

In conventional systems of which the Applicant is aware, feed distribution baffles are positioned in the feed streams in the settler area in an attempt to effect an even flow, but these systems do not produce a suitably even distribution of fluids at higher flow throughputs. A common problem with such baffles is that they are highly susceptible to scaling, leading to significant down-time and process interruption for cleaning or replacement of baffle elements. Other systems of which the Applicant is aware include fixed obstacles or deflector plates placed within the settler area, but these systems have significant drawbacks in terms of settler kinetics and flow dynamics. So-called split launders and variable-split launders have also been used in certain systems, but these are also of little value in ensuring smooth fluid flow and dispersion distribution.

The present invention has as one object thereof to overcome substantially the abovementioned problems of the prior art or to at least provide a useful alternative thereto.

The preceding discussion of the background art is intended to facilitate an understanding of the present invention only. The discussion is not an acknowledgement nor admission that any of the material referred to is or was part of the common general knowledge as at the priority date of the application.

Throughout the specification and claims, unless the context requires otherwise, the word "comprise" or variations such as "comprises" or "comprising", will be understood to imply the inclusion of a stated integer or group of integers but not the exclusion of any other integer or group of integers.

SUMMARY OF INVENTION

In accordance with the present invention there is provided a distribution array for use in a settler area of a mixer-settler, the distribution array characterised by:
  at least one panel of linearly-spaced barrier elements, wherein the depth of the barrier elements, relative to a length of the settler area in which it is to be positioned, is greater than the spacing between the barrier elements, thereby defining a fluid flow channel between adjacent barrier elements that is longer than it is wide.

Preferably, there are at least two panels of linearly-spaced barrier elements provided in the distribution array.

Still preferably, the panels of linearly-spaced barrier elements provided in the distribution array are arranged relative to one another such that the fluid flow channels defined in each panel are off-set relative to one another thereby defining a tortuous flow path through the panels.

The spacing between the two or more panels may be varied to provide even and parallel flow distribution across the width of the settler. Further, the distribution array is such that there is only minimal impact on dynamic head loss across the distribution array. The number of sequential arrays in each set and the number of sets of arrays may be modified to suit the specific application.

However, depending on the type of materials to be separated, the flow characteristics, desired kinetics, and fluid characteristics, it is possible to introduce more than one array in a settler area.

Preferably, each barrier element has a width that is greater than the depth, relative to a length of the settler area in which it is to be positioned, of a channel defined between adjacent panels.

Still preferably, the channel defined between barrier elements is of a narrower width than the depth of those barrier elements.

The depth of each barrier element may be between 100% and 250% of the width of the channel defined between the rows of barrier elements.

The rows of barrier elements may be spaced between 30 mm and 50 mm from each other.

Each barrier element may be spaced between 30 mm and 60 mm from each other.

The channel defined between adjacent barrier elements may have a depth of between 60 mm and 100 mm.

Each barrier element may be between 88 mm and 175 mm in cross-sectional width.

The barrier elements may be equally spaced from one another. In another embodiment, the barrier elements may be unequally spaced from one another. In a still further embodiment the barrier elements within a single panel may be provided at varying distances from one another.

The spacing between the barrier elements may be selected such that it results in a reduction of between 80% and 100% in transverse momentum of a feed fluid when compared to a free flow system in which the array of the invention is not present.

The barrier elements may be aligned generally parallel to each other and may span substantially the width of a settler area.

The barrier elements may be fixed, retractable, or movable within the settler area.

The spacing between the barrier elements further may be such that it results in the fluid flow being re-directed towards a discharge launder, while being substantially parallel to the sides of the settler area.

The invention extends, in another aspect thereof, to a settler area in which is provided a distribution array as described hereinabove.

In accordance with the present invention there is further provided a method of facilitating distribution of a fluid flow in a settler, the method characterised by the step of:

in a settler, providing a distribution array as described hereinabove.

The distribution array of the present invention may be retrofitted to existing settler arrangements.

In accordance with the present invention there is still further provided a mixer-settler characterised in that a settler area of the mixer-settler has provided therein one or more distribution arrays as described hereinabove.

The positioning of the barrier element array in the settler area may be varied according to the type of materials to be separated, the flow characteristics, desired kinetics, and fluid characteristics.

Further aspects of the invention will now be described with reference to the following non-limiting examples and drawings.

BRIEF DESCRIPTION OF THE DRAWINGS

The present invention will now be described, by way of example only, with reference to one embodiment thereof and the accompanying drawings, in which.

DESCRIPTION OF EMBODIMENTS

The Applicant has investigated the transverse nature of flow patterns in settlers and has identified and analysed pressure gradients which were found to develop in the conventional feed systems used therein. CFD (computational fluid dynamics) was the principal tool utilised to evaluate feed distribution systems, while quantitative distribution measurement was utilised to rank each system that was tested.

The distribution array of the present invention as described herein defines fluid flow channels or slots for feed fluids to flow through. The channels are defined by barrier elements provided as panels of such barrier elements, wherein the fluid flow channels between the barrier elements are longer than they are wide, relative to a length of the settler area in which the panel is to be positioned or is located. This greatly reduces any transverse fluid flow in the settler area subsequent to the distribution array.

It was found that variation in the spacing between the panels of barrier elements that extend across the width of the settler leads to an equalisation of the pressure differential generated by the mixer-settler geometry (that is, conventional, side feed, reverse flow geometries, and the like). During the evaluation of existing systems, CFD was the principal tool utilised to review and analyse feed distribution systems. Specifically, quantitative distribution measurement was utilised to rank each of the various systems analysed and to provide quantitative data. The Applicant, following the evaluations, found surprisingly, that obstacles to guide the flow of streams to be separated were of little value in ensuring smooth flow. Specifically, the Applicant found that so-called split launder systems or systems using traditional baffles were of little value in ensuring smooth flow.

Figure 1:
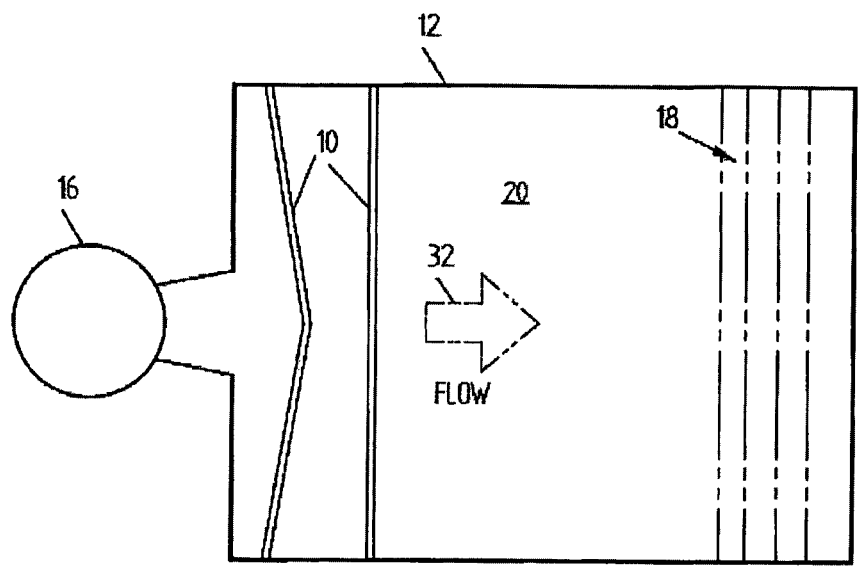
FIG. 1 is a top plan view of a mixer-settler, in the settler tank of which is provided a distribution array in accordance with the present invention.

In FIG. 1 there are shown two distribution arrays 10 provided in, and extending laterally across with width of, a settler area or tank 12. A mixer tank 16 is provided adjacent to the settler tank 14 and is arranged to direct fluid therefrom into the settler tank 12. The settler tank 12 has provided therein a number of discharge launders 18 positioned remotely from the settler tank 12 and distribution arrays 10, providing an area 20 therebetween in which settling may take place.

Figure 2:
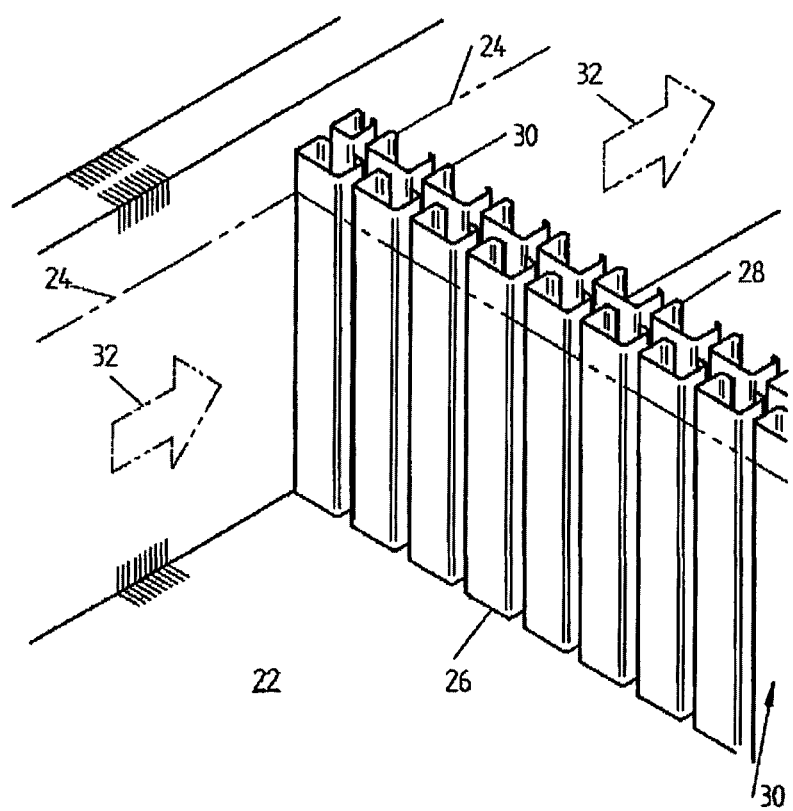
FIG. 2 is an upper perspective view of a portion of the distribution array of FIG. 1, again shown in position in a settler tank.
Figure 3:
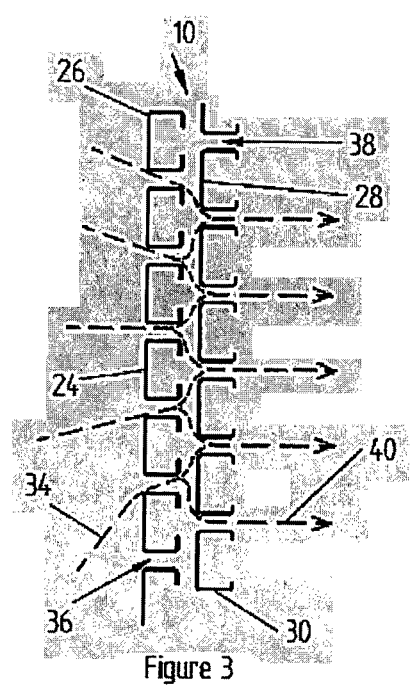
FIG. 3 is top view sectional view of the distribution array of FIG. 1, showing fluid flow paths therethrough.

In FIGS. 2 and 3 there is shown one of the distribution arrays 10 in greater detail. Each distribution array 10 extends from a base 22 of the settler tank 12 upwardly to a point above a fluid level 24 therein, as is best seen in FIG. 2. Each distribution array 10 comprises an upstream panel 26 and a downstream panel 28. Each panel 26 and 28 is comprised of a plurality of substantially upright barrier elements 30 which are arranged so as to be substantially parallel with respect to their laterally adjacent barrier elements 30. Each barrier element 30 is generally rectangular in top section, as can best be seen with reference to FIG. 3 and the C-section depicted, in which the rear portion of the rectangle is open and the closed face of the rectangle presents to an on-coming fluid flow, described hereinafter. Further each barrier element 30 presents a greater width to oncoming fluid flow than it is deep, relative to the direction of that fluid flow.

The rows of barrier elements are spaced between about 30 mm and 50 mm from each other. Further, each barrier element is spaced between about 30 mm and 60 mm from each other.

The channel defined between adjacent barrier elements has a depth of between about 60 mm and 100 mm.

Each barrier element is between about 88 mm and 175 mm in cross-sectional width.

As noted hereinbefore, a fluid stream 32 emanating from the upstream mixer 16 is directed into the settler tank 12 to flow therethrough and to facilitate settling to occur therein. With specific reference to FIG. 3, an upstream flow 34 encounters the upstream panel 26 and is caused to flow through upstream flow channels 36 formed between the adjacent barrier elements forming the panel 26. This flow is then caused to move laterally within the settler tank 12 as it encounters the barrier elements 30 of the downstream panel 28. The flow moves laterally to the point at which it is able to pass through a downstream flow channel 38 and form downstream flow 40.

The depth of the barrier elements 24 of each panel 26 and 28, relative to a length of the settler tank 12 in which it is positioned, is smaller than the transverse width thereof. More importantly, the depth of each barrier element 30 is between 100% and 250% of the width of the channel defined between the rows of barrier elements 24. This arrangement has been found by the Applicant to balance flow distribution across the width of the settler tank 12.

The number of panels 26 and 28, and flow channels 36 and 38, may be varied to suit specific applications. However, providing two panels 26 and 28 as described herein has been found by the Applicant to achieve substantially even distribution of fluid across the full width of the settler with little dynamic head loss.

Even feed distribution is essential to achieve the maximum value from the installed settler area and this is a problem in many solvent extraction plants utilising a mixer followed by a settler. As noted previously, conventional mixer-settlers are designed in an effort to distribute to both sides of the settler turning the flow first by 90 degrees then back by 90 degrees. Reverse flow and side feed mixer settlers must distribute across the full width of the settler and turn the flow by 180 degrees and 90 degrees respectively. As noted previously, conventional mixer-settlers create recirculating zones and dead zones within the settler, in which fluid does not flow or flows in an unintended direction, often the reverse direction.

This distribution array of the present invention may thus be utilised to increase the throughput and/or reduce entrainment losses of existing solvent extraction facilities. Advantageously, this invention may be utilised to reduce the settler area required in solvent extraction plants.

The barrier elements may be equally spaced from one another. In another embodiment, the barrier elements may be unequally spaced from one another. In a still further embodiment the barrier elements within a single panel may be provided at varying distances from one another.

The spacing between the barrier elements may be selected such that it results in a reduction of between 80% and 100% in transverse momentum of a feed fluid when compared to a free flow system in which the array of the invention is not present.

As shown in FIG. 1, one or more of the distribution arrays 10 may be angled relative to the longitudinal orientation of the settler tank. However, the upright barrier elements are provided in-line with the flow path of the fluid stream.

Modifications and variations such as would be apparent to the skilled addressee are considered to fall within the scope of the present invention.

The invention claimed is:

1. A distribution array for use in a settler area of a mixer-settler, the distribution array further comprising:
   at least an upstream panel and a downstream panel of linearly-spaced barrier elements, wherein a depth of the barrier elements, measurable along a length of the settler area in which each barrier element is to be positioned, is greater than a spacing between the barrier elements, thereby defining a fluid flow channel between adjacent barrier elements that is longer than it is wide;
   wherein the upstream panel is spaced apart from the downstream panel and the upstream and downstream panels are arranged relative to one another such that the fluid flow channels defined in the upstream panel are laterally off-set along a width of the settler area in a staggered relationship relative to the fluid flow channels defined in the downstream panel thereby defining a tortuous flow path through the upstream and downstream panels; and
   wherein the distribution array is such that there is only minimal impact on dynamic head loss across the distribution array.

2. The distribution array according to claim 1, wherein the spacing between the upstream and downstream panels is selected to provide even and parallel flow distribution across the width of the settler.

3. The distribution array according to claim 1, wherein each barrier element has a width that is greater than a depth, measurable along the length of the settler area, of a channel defined between the upstream and downstream panels.

4. The distribution array according to claim 3, wherein the width of each barrier element may be between about 100% and 250% of the depth of the channel defined between the upstream and downstream panels.

5. The distribution array according to claim 3, wherein the upstream and downstream panels are spaced about 30 mm to 50 mm from each other.

6. The distribution array according to claim 1, wherein the barrier elements are spaced about 30 mm to 60 mm from each other.

7. The distribution array according to claim 1, wherein the channel defined between adjacent barrier elements has a depth of between about 60 mm and 100 mm.

8. The distribution array according to claim 1, wherein each barrier element is between about 88 mm and 175 mm in cross-sectional width.

9. The distribution array according to claim 1, wherein the barrier elements are equally spaced from one another.

10. The distribution array according to claim 1, wherein the barrier elements are unequally spaced from one another.

11. The distribution array according to claim 1, wherein the barrier elements within a single panel are provided at varying distances from one another.

12. The distribution array according to claim 1, wherein the barrier elements within a single panel are aligned with each other in a straight line and together span substantially the width of the settler area.

13. The distribution array according to claim 1, wherein the barrier elements are either fixed, retractable, or movable within the settler area.

14. The distribution array according to claim 1, wherein the spacing between the barrier elements is such that it results in the fluid flow being re-directed towards a discharge launder provided in the settler area, while being substantially parallel to sides of the settler area.

15. A method of facilitating distribution of a fluid flow in a settler, the method further comprising the step of:
   in a settler, providing a distribution array as described in claim 1.

16. The method according to claim 15, wherein the positioning of the or each distribution array in the settler area is varied according to the type of materials to be separated, the flow characteristics, desired kinetics, and fluid characteristics.

17. The method according to claim 15, wherein the distribution array is retrofitted to an existing settler-mixer.

18. A mixer-settler wherein a settler area of the mixer-settler has provided therein one or more distribution arrays as described in claim 1.

19. The mixer-settler according to claim 18, wherein the positioning of the or each distribution array in the settler area is varied according to the type of materials to be separated, the flow characteristics, desired kinetics, and fluid characteristics.

20. A settler area in which is provided a distribution array as described in claim 1.

21. The distribution array according to claim 1 wherein the spacing between the barrier elements is such that it results in a reduction of between 80% and 100% in transverse momentum of a feed fluid when compared to a free flow system in which the distribution array is not present.

* * * * *